Patented Oct. 22, 1940

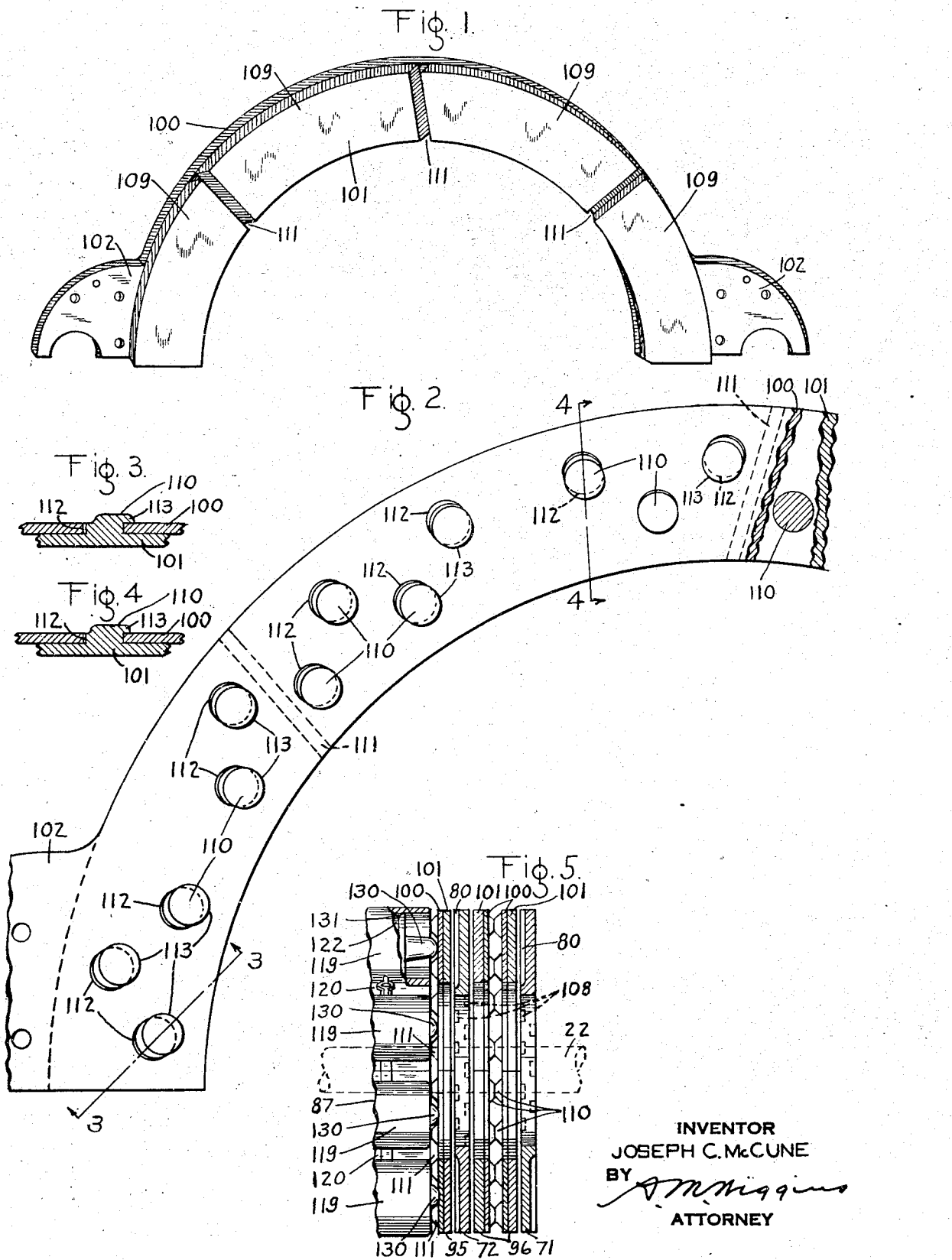

2,218,615

UNITED STATES PATENT OFFICE 2,218,615

VEHICLE BRAKE SHOE

Joseph C. McCune, Edgewood, Pa., assignor to The Westinghouse Air Brake Company, Wilmerding, Pa., a corporation of Pennsylvania Original application August 19, 1938, Serial No. 225,785. Divided and this application May 31, 1939, Serial No. 276,638

2 Claims. Cl. (188—251)

This invention relates to brake mechanism for vehicle wheels and more particularly to a friction brake element for use in such mechanism, the present application being a division of my copending application Serial No. 225,785, filed August 19, 1938.

As illustrated in the copending application referred to, a disc brake mechanism has been proposed comprising annular rotatable and non-rotatable, ring-like friction discs so arranged and associated with a vehicle wheel as to effect braking of said wheel upon the discs being forced into frictional braking engagement. In order to provide most efficient braking, the braking discs are often built up of different materials, i. e. provided with a tough frame like structure capable of a certain degree of deflection without breaking, and to this structure is secured in one way or another the desired braking material which may be a metal, a fibrous structure or of any other suitable material to provide the frictional characteristics required.

The principal object of the present invention is to provide a novel friction disc brake element for use in disc brake mechanisms, which element is adapted to be readily and cheaply manufactured and which will provide efficient braking and long life.

Other objects and advantages will be apparent from the following more detailed description of the invention.

In the accompanying drawing; Fig. 1 is an isometric view of one-half of a disc brake element looking at the braking face thereof and constructed in accordance with the invention; Fig. 2 is a view on an enlarged scale of a portion of the disc brake element shown in Fig. 1, but looking at the opposite face thereof; Figs. 3 and 4 are sectional views taken on the lines 3—3 and 4—4 in Fig. 2; and Fig. 5 is a diagrammatic view of a portion of a simplified disc brake mechanism.

For the purpose of illustrating one application of the invention, it is shown in the drawing associated with an annular non-rotatable brake element or disc of a disc brake mechanism of the type which embodies one or more non-rotatable and rotatable brake discs arranged to be moved into frictional interengagement for effecting braking of a rotating member, such as the axle or wheel of a vehicle. This arrangement of parts is illustrated in the simple, diagrammatic form of disc brake mechanism shown in Fig. 5 of the drawing wherein the reference numerals 71 and 72 designate two annular rotatable friction brake elements or discs, and the reference numerals 95 and 96 designate two annular non-rotatable friction brake elements or discs interleaved with the rotatable elements in concentric relation therewith and with the non-rotatable brake element 95 arranged at one end of the pile.

Both the rotatable and non-rotatable brake elements are shown in Fig. 5 encircling an axle 22 to which the rotatable brake elements 71 and 72 are secured in any desired manner (not shown) so as to turn with said axle. The non-rotatable brake elements 95 and 96 are supported in concentric relation with the rotatable brake elements and held against rotation in any desired manner (not shown). The rotatable brake elements 71 and 72 are both provided in their braking faces with a plurality of radially arranged slots 80, the side walls of which are adapted to act as a fan upon rotation of said elements to force air between the rotatable and non-rotatable elements when in frictional braking engagement to dissipate heat from said elements and to thereby provide most efficient braking operation thereof.

The reference numeral 87 designates a brake cylinder device which is of an annular ring-like form and which encircles the axle 22 adjacent the outer face of the non-rotatable brake element 95. The brake cylinder device is adapted to be supported in any desired manner (not shown) in concentric relation with the brake elements and comprises a plurality of small circular brake cylinders 119 arranged in spaced relation in a circle around the axle and with their axes parallel to the axis of axle 22 and in line with the non-rotatable element 95 substantially midway between its inner and outer peripheries. The several brake cylinders 119 are secured in spaced relation by connecting webs 120.

Each of the brake cylinders 119 is provided with a bore in which there is disposed to operate a brake cylinder piston 122. This piston is provided on its outer face with an outwardly extending piston stem 130 the end of which is rounded and adapted to engage the non-rotatable element 95. The outer face of each of the brake cylinder pistons 122 is at all times subject to atmospheric pressure through the open end of the piston bore, while at the opposite side of each piston there is provided a pressure chamber 131 to which fluid under pressure is adapted to be supplied for effecting movement of the piston in the direction of the brake elements. When the pistons 122 are thus operated, they are adapted to move the brake elements into frictional interengagement to effect braking of the axle 22. Fluid under pressure is adapted to be released from the chamber 131 in the several brake cylinder devices to relieve the pressure between the several brake elements, whereupon any suitable means (not shown) are adapted to return the brake elements to their release positions in which said elements are disengaged from each other, as shown in Fig. 5. When the brake elements are thus disengaged from each other, the axle 22 is free to rotate.

A further detailed description of the brake mechanism is not believed essential to a comprehensive understanding of the invention, which will now be described.

The non-rotatable brake element 95 has a braking face only on the side adjacent the rotatable brake element 72, while the non-rotatable brake element 96 is made up of two ring or disc-like elements each of which is like the element 95, but which are arranged in back to back relation to provide friction faces on the opposite sides thereof for frictional braking engagement with the adjacent braking faces of both of the rotatable brake elements 71 and 72.

The non-rotatable brake element 95 and each of the two ring or disc-like elements comprising the non-rotatable brake element 96 are identical in structure, each comprising two, like, oppositely disposed semi-circular sections arranged in end to end abutting relation and secured in such relation in any desired manner (not shown). The lines of division between these sections are shown in Fig. 5 of the drawing.

Each of the semi-circular sections embodied in the non-rotatable brake elements 95 and 96 is constructed as shown in Figs. 1 to 4 of the drawing and comprises a semi-circular backing plate 100 provided at its opposite ends with ears 102 for the purpose of securing the halves of the brake element together and for supporting said element by means and in a manner not shown.

The backing plate 100 is made of any desired, relatively thin, tough material, such as sheet steel, and mounted on one side of said plate is a substantially semi-circular brake shoe 101 arranged for frictional braking engagement with the braking face of the adjacent rotatable brake element. The brake shoe 101 may be made of any desired friction braking material, but in the present embodiment of the invention is preferably made of cast iron.

Each of the semi-circular brake shoes 101 comprises a plurality of arcuate sections 109 secured to the braking plate 100 by spaced, integrally formed rivet-like projections 110.

The adjacent ends of each two shoe sections 109 are arranged at an angle to the radius of the element to avoid any possibility of interlocking with the sidewalls of the slots 80 in the adjacent faces of the rotatable braking elements 72 or 71 and are also spaced slightly apart as by slots 111 to minimize warping of the backing plates 100 during the process of manufacture, which will now be described.

Each of the backing plates 100 is punched from sheet steel to the desired size and shape and then provided with a plurality of punched holes 112 located and spaced in predetermined relation throughout the length of the plate.

The punching of the holes 112 provides holes, as is well known, which are of larger diameter at the side of entry of the punch than at the opposite side and which have a slight radius at the edge of larger diameter, both of which features are important factors in rigidly securing the shoe sections 109 to the backing plates 100, as will be now described.

The shoe sections 109 are cast from iron directly on to each backing plate 100. After the mold is made for molding the shoe sections 109 and rivet-like elements 110 on to the backing plate 100, the backing plate is placed into the mold with the smaller ends of the punched holes 112 at the side upon which the shoe sections are to be cast. The cast iron is then poured into the mold to form the shoe sections on the one side of the plate and from that side flows through the holes 112 to the opposite side to form the button like rivets 110.

When the molten cast iron strikes the relatively cool backing plate 100, the backing plate expands and moves in the mold relatively to the cast iron in the mold cavities at the two sides of the plate and during this expansion shears part way through the base portions of the buttons 110, which are still in a plastic state. This shearing action provides the majority of the buttons 110 with a substantially semi-circular shoulder 113 which laps over the backing plate 100, as shown, slightly exaggerated for the purpose of clarity, in Figs. 2 to 4 of the drawing. In addition to these shoulders 113, the portion of the button like rivets 110 engaging the side walls of the holes 112 in the plate 100 is tapered, having a larger section at the side of the plate opposite the shoe sections than adjacent the shoe sections, which also act to tightly bind the shoe sections to and thus against movement away from the plate.

Although upon cooling the shoe sections 109 and backing plate 100 retain substantially the same relationship as obtained at the end of the expansion of the backing plate, the slight difference in the coefficient of expansion of the two metals comprising the backing plate and shoe sections is taken advantage of in locating the punched holes 112 in the backing plate, so that the slight movement of the one metal relative to the other upon cooling will effect a high degree of binding between the button like rivets 110 and the side walls of holes 112 in the steel plates 100, in various directions relative to the shoe sections. This binding action in conjunction with the locking action of the tapered rivets 110 and the shoulders 113 formed on the ends thereof secure the shoe sections 109 to the backing plate so tightly as to provide in effect an integral structure.

By making the shoe 101 in a number of spaced sections 109 as above described, warping of the backing plate 100 and consequently of the shoe, which would otherwise occur, is avoided.

After the sections of the non-rotatable elements are made, as just described, the cast faces of the shoe sections 109 are ground in order to remove surface irregularities or the like thereon, while the ends of the rivet like buttons 110 are ground off to a predetermined length measured from the backing plate 100.

The ends of the rivet like buttons 110 are ground off as just described for two reasons. One reason is that in the non-rotatable element 95 certain of these buttons 110 are arranged to engage certain spaced portions of the brake cylinder device 87 for defining the release position of said element above described. Another reason is that in the non-rotatable element 96 the buttons 110 in the two backing plates 100 making up this element, engage each other so as to support the oppositely disposed brake shoes 101 against collapse when subjected on their outer faces to braking pressures from the rotatable brake elements 72 and 71. With the brake shoes 101 and backing plates 100 of the non-rotatable element 96 thus supported in spaced relation, a relatively free circulation of air is permitted between the two backing plates 100 thereof, as a vehicle carrying the brake mechanism is moving along a track, and this prevents the transfer of heat, incident to braking, between said brake shoes and also carries away said heat and thus maintains the temperature of said brake shoes at a sufficiently low degree to provide efficient braking. The rivet like buttons 110 are also so arranged as to be out of alignment with the brake cylinder piston stems 130 when the two sections making up the non-rotatable brake element 95 are secured in working relation with the brake cylinder device 87 as shown in Fig. 5, due to which said piston stems are adapted to directly contact and work against the backing plate 100 of said element.

It will be apparent from the above description, that the improved brake element is relatively simple and light weight in construction and cheap to manufacture. The backing plate 100 being made of a tough and somewhat bendable material, such as sheet steel, insures against breakage of the element, while the multi section cast iron shoe 101 also contributes to prevent breakage of said shoe due to distortion of the element which may occur in use. By using the steel backing plate for carrying the brake shoe 101, said shoe may be made from cast iron which provides the desired frictional characteristics to produce efficient braking of vehicles such as employed in railway service.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A braking element for a disc brake mechanism comprising an annular, ring-like metal backing plate having a radial face and a plurality of through openings arranged in predetermined relation around and radially of said face and opening at said face, a cast metal brake shoe cast on said plate against said face and comprising a plurality of sections spaced from each other and each section having a plurality of integral portions extending through certain of said openings locking said sections to said backing plate.

2. An annular friction braking element comprising a pair of oppositely disposed, spaced, ductile metal plates each having a plurality of through openings arranged in oppositely disposed relation around said plates, and a metal brake shoe cast on the outer face of each of said plates and having integral portions extending through said openings securing said shoes to said plates, said integral portions of one shoe engaging those of the opposite shoe between said plates for supporting said shoes and plates in spaced relation to permit the flow of cooling medium between said plates.

JOSEPH C. McCUNE.